(12) United States Patent
Walz (10) Patent No.: US 7,918,217 B2
(45) Date of Patent: Apr. 5, 2011

(54) EXHAUST GAS CHECK VALVE

(75) Inventor: Timo Walz, Gondelsheim (DE)

(73) Assignee: ElringKlinger AG, Dettingen (DE)

( * ) Notice: Subject to any disclaimer, the term of this patent is extended or adjusted under 35 U.S.C. 154(b) by 28 days.

(21) Appl. No.: 12/383,966

(22) Filed: Mar. 31, 2009

(65) Prior Publication Data

US 2009/0277166 A1    Nov. 12, 2009

Related U.S. Application Data

(63) Continuation of application No. PCT/EP2008/001565, filed on Feb. 28, 2008.

(30) Foreign Application Priority Data

Mar. 2, 2007 (DE) .................. 10 2007 010 162
Mar. 23, 2007 (DE) .................. 20 2007 004 323 U (51) Int. Cl.
*F02B 47/08* (2006.01)
*F02B 47/00* (2006.01)

(52) U.S. Cl. .................. 123/568.17; 123/568.18

(58) Field of Classification Search ............. 123/568.11, 123/568.12, 568.17, 568.18; 60/324; 251/337
See application file for complete search history.

(56) References Cited

U.S. PATENT DOCUMENTS

2008/0190404 A1    8/2008    Weisz ............... 123/568.26

FOREIGN PATENT DOCUMENTS

| DE | 198 30 230 A1 | 10/1999 |
| DE | 199 53 198 A1 | 5/2001 |
| DE | 10 2005 020 482 A1 | 11/2006 |

*Primary Examiner* — Mahmoud Gimie

(57) ABSTRACT

Exhaust gas check valve with a movable valve element held by a plurality of return springs, an exhaust gas through-opening closable by the valve element, and a stop element delimiting the stroke of the valve element; in order to improve the service life of the check valve, damping means are provided in the check valve for bringing about a comparatively gentle breaking of the valve element when at the end of its stroke it approaches that position in which the check valve is fully open, the damping means comprising spring elements holding the stop element, and/or a gas space which, when the check valve is open, is defined and at least almost closed by the valve element and the stop element.

52 Claims, 6 Drawing Sheets

EXHAUST GAS CHECK VALVE

This application is a continuation of international application number PCT/EP2008/001565 filed on Feb. 28, 2008.

The present disclosure relates to the subject matter disclosed in international application number PCT/EP2008/001565 of Feb. 28, 2008, in German patent application number 10 2007 010 162.9 of Mar. 2, 2007, and in German utility model application number 20 2007 004 323.6 of Mar. 23, 2007, which are incorporated herein by reference in their entirety and for all purposes.

BACKGROUND OF THE INVENTION

The invention relates to an exhaust gas check valve for an exhaust gas return line leading from an exhaust gas side to a fresh air side of an internal combustion reciprocating piston engine, the exhaust gas check valve comprising a movable valve element made of flat material, which is held by a plurality of return springs, and a valve seat with an exhaust gas through-opening which defines an axis of the check valve and is at least almost closable by the valve element in a closed position of the valve element, the return springs being arranged in spaced relation to one another at the circumference of the valve element, and the valve element being movable in the direction of the valve axis away from the valve seat against the action of the return springs by a flow of exhaust gas flowing against the exhaust gas through-opening in the direction towards the valve element or by an overpressure acting in this direction.

Exhaust gas recirculation (EGR), whereby a portion of the exhaust gases is recirculated back into the combustion chambers of the engine, offers one possibility of reducing the pollutant emissions of internal combustion reciprocating piston engines without any considerable additional consumption of fuel. Since the combustion temperatures in the combustion chambers are thereby lowered, the formation of nitrogen oxides ($NO_x$) is also reduced.

Since in charged engines the pressure level in the engine inlet port downstream of that point at which the charging takes place, for example, by means of a compressor or an exhaust gas turbocharger, is higher, at least for a short time, than the pressure level in the exhaust gas outlet port of the engine, in the case of exhaust gas recirculation without an exhaust gas check valve, the flow of gas in the exhaust gas return line would then run from the engine inlet port to the exhaust gas outlet port. On the other hand, a recirculation of the exhaust gases to a point upstream of the charging unit bringing about the charging would be uneconomical as, for example, for reasons of resistance to corrosion of the charging unit, high-quality and, therefore, expensive materials would then have to be used for this unit.

Now, the pressure in the exhaust gas line of an internal combustion reciprocating piston engine is not constant over time, but fluctuates strongly in the rhythm of the combustion processes in the combustion chambers (cylinders) of the engine. The pressure peaks arising in the exhaust gas line occur in each case after opening of one of the outlet valves of the engine, and the pressure level of these pressure peaks lies above the pressure in the engine inlet port. Since in a 4-stroke 4-cylinder engine, the outlet valve of a cylinder is opened after each 720° angle of rotation of the crankshaft, the frequency of the pressure pulsations occurring in the exhaust gas line is already relatively high at 600 revolutions per minute (it is then 20 Hz) and the period of the pressure pulsations in the exhaust gas line is then only 0.05 seconds, the time during which overpressure prevails in the exhaust gas line, i.e., the time during which the outlet valve is open, being only approximately ⅙ of the period of the exhaust gas pressure pulsations. For this reason, an exhaust gas check valve must have very short switching times, i.e., it must be able to open and close within an extremely short time.

In an exhaust gas check valve known from DE-A-199 53 198, a valve seat enclosing a rectangular exhaust gas through-opening is formed on a prism-shaped part of a valve body to which a valve element in the form of a rectangular leaf spring is attached with its one narrow side area, more particularly, by the valve element in this area being clamped between the valve body and a similarly rectangular, plate-like stop, which is approximately congruent with the valve element, but outside the clamping area is so inclined with respect to the valve seat that the valve element can be swiveled up around the clamping area through a small acute angle and therefore lifts off of the valve seat—the stop therefore delimits the swivel angle of the valve element and defines its open position. The valve seat has an elastomeric coating capable of bearing thermal stress for sealing and damping purposes. This known exhaust gas check valve has a large number of disadvantages: Owing to the fact that the valve element can only be swiveled up around its one narrow side area through a relatively small acute angle, the flow cross section for the flow of exhaust gas is relatively small when the check valve is open. Since the rectangular leaf spring forming the valve element must be bent over the entire length of its narrow side area in order to open the check valve, an opening of the check valve requires a considerable pressure difference between the inflow and outflow sides of the valve, and even a relatively small drop in the pressure difference has the consequence that the check valve is no longer fully open. Since the rectangular valve element is swiveled around its one narrow side area, the short opening and closing times described above result in high speeds of the valve element in the area of its free narrow side, and the rapid whip-like movements of the valve element may result in destruction of the leaf spring forming the valve element. Finally, this known check valve is a relatively elaborate construction, firstly, owing to the complicated design of the valve body and, secondly, because the valve element and the stop holding it on the valve body are attached by screws to the valve body. Above all, owing to the disadvantages first set forth above, the high exhaust gas recirculating rates required for modern engines cannot be realized with this known check valve—the current requirement is that up to 25% of the exhaust gases be recirculated back into the engine combustion chambers.

An exhaust gas check valve which is improved with respect to its exhaust gas flow cross section, its response characteristic and the service life of the valve element is shown in FIGS. 4 and 5 of DE-A-10 2005 020 482. In this check valve, the valve element consists of sheet spring steel, has the shape of a circular disk and is provided with three return springs which are integral with the valve element and, consequently, also consist of sheet spring steel. Each return spring has, in a plan view of the valve element, essentially the shape of a strip-like circular arc, which continues at a first end of the return spring through a small 90° arc, bent in the direction towards the center of the plate-shaped valve element, into the valve element, and at the other, second end of the return spring continues through a further small 90° arc into an attachment area which with respect to the center of the valve element points radially outwardly. These attachment areas of the three return springs are fixed to a multi-part housing of the check valve, and when no forces are acting on the valve element it lies on a valve seat formed by an end of an exhaust gas inlet connection part of the valve housing. In a plan view of the valve element, each of the three return springs extends over somewhat less than 120° of the circumference of the valve element, and the first ends of the return springs are arranged at identical 120° spacings from one another along the circumference of the valve element. If, in this known exhaust gas check valve, a flow of exhaust gas flowing into the exhaust gas inlet connection part flows against the valve element, then the plate-shaped valve element lifts off of the valve seat in the direction of the axis of the inlet connection part if the gas pressure at the inflow side of the valve element is greater than at the side of the valve element facing away from the valve seat. In this known check valve, the plate-shaped valve element therefore moves in its entirety perpendicularly to the plane defined by the valve seat or by the plate-shaped valve element between its closed position and its open position, and, when the check valve is open, the flow of exhaust gas flowing into its inlet connection part can flow through the check valve over almost the entire circumference of the plate-shaped valve element past it and past the return springs. In this embodiment of the known check valve, a stop element is not provided for the valve element.

Furthermore, a modified embodiment of the check valve is described in DE-A-10 2005 020 482, wherein a plate-shaped valve element in its closed position is pressed by a helical compression spring against the valve seat formed by the inlet connection part, this helical compression spring lying against the side of the valve element that faces away from the inlet connection part (embodiment according to FIGS. 7 to 9). Furthermore, stop elements for the valve element are provided in this modified embodiment, which delimit the stroke of the valve element up to an open position of the valve element and are formed by finger-like projections of an outlet connection part of the valve housing that extend in the direction of the valve axis and project into the helical compression spring in the direction towards the valve element. In this modified embodiment, according to section [0048] of DE-A-10 2005 020 482, the helical compression spring may be dispensed with if in this modified embodiment the valve element of the embodiment according to FIGS. 4 and 5 provided with the three return springs described above is used.

In the exhaust gas check valve known from FIGS. 7 to 9 in conjunction with section [0048] of DE-A-10 2005 020 482, owing to the short opening and closing times of an exhaust gas check valve described above and the resulting high accelerations and decelerations of the component consisting of the plate-shaped valve element and its three return springs, the return springs can "overshoot" if the valve element, upon opening, strikes the stop elements formed by the outlet connection part of the valve housing and abruptly comes to a brief standstill. Such overshoot (further deflection of the spring areas lying between the ends of the return springs) leads to tension peaks in the end areas of the return springs, which may result in permanent breakages of the return springs.

The object underlying the invention was to improve an exhaust gas check valve of the kind defined at the outset with respect to its service life, and this object is accomplished, in accordance with the invention, in that damping means are provided in the check valve, by means of which a comparatively gentle braking of the valve element is brought about when, at the end of its stroke, it approaches that position, namely its open position, in which the check valve is fully open.

The principle underlying the solution according to the invention can be achieved particularly simply by at least one resiliently held stop element or by providing for the valve element a stop which owing to a corresponding design of the stop element and/or the valve element, forms together with the latter an at least almost tight gas space when the valve element is in its open position, for the movement of the valve element in the direction towards its open position is then braked when shortly before closing the gas space, the gases located therein must escape through a progressively narrowing slit between stop and valve element or be compressed between stop and valve element. In preferred embodiments of the check valve according to the invention, both measures are combined with each other.

The first measure is easiest to implement by the check valve comprising on the side of the valve element that faces away from the valve seat at least one stop element, which delimits the stroke of the valve element up to an open position of the valve element and is held by at least one spring element for movement in the direction of the valve axis, so that the valve element is braked comparatively gently when it touches the stop element and together with it covers a further short distance in the direction of the valve axis.

The second measure mentioned above can be implemented particularly easily by the check valve again comprising, on the side of the valve element that faces away from the valve seat a stop element, which delimits the stroke of the valve element up to an open position of the valve element and which, seen in the direction of the valve axis, i.e., in a plan view in a direction perpendicular to a plane defined by the exhaust gas through-opening, is of plate-shaped design, as is the valve element, and by the valve element and the stop element being of such shape that in its open position the valve element defines together with the stop element a gas space which is at least almost closed by the valve element in its open position and the stop element. For such a design of the check valve according to the invention, it is also advantageous for the stop element to be held by at least one spring element for movement in the direction of the valve axis in order to further improve the damping of the movement of the valve element while the check valve is opening.

For the same reason, it is advantageous, in a check valve according to the invention, in accordance with the first solution, for the stop element and the valve element—seen in the direction of the valve axis—to be designed in the form of plates and for the valve element and the stop element to be of such shape that in its open position the valve element defines together with the stop element a gas space which is at least almost closed by the valve element in its open position and the stop element.

In all embodiments of the check valve according to the invention with a resiliently held stop element, it is advantageous for the stop element to be held by a plurality of spring elements which are arranged in spaced relation to one another at the circumference of the stop element in order that the stop element, when the valve element strikes the stop element, carries out the same movement as the valve element until the valve element has reached its open position. It is, therefore also recommended that the return springs for the valve element be arranged in spaced relation to one another at its circumference.

Above all, when the valve element and/or the stop element is or are of plate-shaped design, it is recommended, for manufacturing reasons, that the return springs and/or the spring elements be designed as strip-like springs made of flat material. It is then possible to manufacture the valve element including its return springs and/or the stop element including its spring elements as a simple stamped part, in particular, out of a sheet of spring steel and preferably out of a sheet of stainless spring steel.

In order to keep the dimensions of a check valve according to the invention as small as possible, it is recommended that the return springs and/or the spring elements be so designed that each of the return springs and/or each of the spring elements—seen in the direction of the valve axis—forms an arcuate strip, the center of curvature of which coincides approximately with the center of the valve element or the valve axis, and one, first end of which carries the valve element or the stop element (as is known for a valve element from FIG. 5 of DE-A-10 2005 020 482). In this way, the radial dimensions—with respect to the valve axis—of the respective part can be kept particularly small.

In such embodiments, the arcuate strips forming the return springs or the spring elements could be of such dimensions in their length that they do not overlap, as is the case in the valve element according to FIG. 5 of DE-A-10 2005 020 482. With a view to obtaining as large a stroke as possible of the valve element and as small a bending load as possible on the return springs or the spring elements, above all, in their end areas, it is, however, advantageous to make the length of the return springs or the spring elements as large as possible, which is possible without any considerable increase in the radial dimensions when, seen in the direction of the valve axis, at least those two arcuate strips of two return springs or two spring elements, whose first ends are arranged in proximity to each other at the circumference of the valve element or the stop element, overlap each other over a portion of their length. In particularly advantageous embodiments, each arcuate strip is overlapped over a first portion of its length by a—seen from the valve axis—radially further outwardly lying arcuate strip and overlaps over another portion of its length a further inwardly lying arcuate strip.

In embodiments with return springs or spring elements partially overlapping one another, a particularly compact construction is obtained when, seen in the direction of the valve axis, the arcuate strip of a return spring or a spring element has a shape corresponding approximately to a section of a spiral, and along the strip in the direction towards the first strip end the arcuate strip approaches the valve axis, i.e., the circumference of the valve element or the stop element.

Similarly, with a view to obtaining as compact a construction as possible, it is, finally proposed that the return springs or spring elements be so designed that, seen in the direction of the valve axis, each return spring or each spring element is offset between its ends in the direction towards the valve axis at a point in the proximity of the second end of the further outwardly lying return spring or the further outwardly lying spring element, such an offset being particularly effective with respect to minimizing the constructional size when the first end, i.e., the transition to the valve element or to the stop element, of the further inwardly lying return spring or the further inwardly lying spring element is in the proximity of the offset.

In particularly preferred embodiments of the check valve according to the invention, both the valve element and the stop element have approximately the shape of a circular disk, more particularly, such that, seen in the direction of the valve axis, the stop element and the valve element lie congruently over one another. The stop element may, however, also have the shape of a circular ring.

For the sake of completeness, it should be noted that, seen in the direction of the valve axis, the return springs or the spring elements could also have a different shape than a shape corresponding approximately to a circular arc. For example, each return spring or each spring element, seen in the direction of the valve axis, could have a hairpin-shaped section or two hairpin-shaped sections and, therefore, resemble a flat-pressed U or a flat-pressed S, as was disclosed in German patent application No. 10 2007 010 162.9.

All of these embodiments with return springs or spring elements formed by strips of flat material have the common advantage that owing to the comparatively large length of the springs made of flat material, the return springs or the spring elements have a comparatively small spring constant. Therefore, only a comparatively small pressure difference is required between the inflow side and the outflow side of the valve element for the opening of the check valve, and the valve element is braked comparatively gently when it approaches its open position, and a relatively large flow cross section is available for the flow of exhaust gas when the check valve is open.

Embodiments of the check valve according to the invention, which are particularly simply constructed and can be manufactured particularly cost-effectively, comprise a base plate provided with the exhaust gas through-opening and the valve seat, a valve element plate provided with the valve element and the return springs, and a stop element plate provided with the stop element and the spring elements. Such a check valve is particularly compact in the direction of the valve axis. Also, one or more or even all of these plates can be manufactured from metal sheets by simple stamping processes. In this connection, it is, however, pointed out that other suitable temperature-resistant materials may also be used, for example, temperature-resistant plastics, but sheets of high-grade steel and, for the plates provided with the valve element and the stop element, sheets of stainless spring steel, are preferred.

Since the aim is to achieve a small spring constant of the return springs, it is recommended that a flat material whose thickness is only a fraction of the thickness of the flat material used for manufacturing the base plate be used for the valve element plate. A spring steel sheet with a thickness of, in particular, only 0.1 to 0.5 mm is preferably used for the valve element plate, a thickness of approximately 0.2 to 0.3 mm being particularly advantageous. However, the material of the stop element plate preferably has a larger thickness than the material used for the valve element plate.

In order that in an exhaust gas check valve according to the invention not only an "overshoot" of the return springs holding the valve element will be prevented when the valve element comes to a brief standstill upon opening of the check valve, but that in this phase an "overshoot" of the spring elements holding the stop element cannot take place either, in particularly advantageous embodiments of the exhaust check valve according to the invention, the spring constant of the spring elements holding the stop element is considerably larger than the spring constant of the return springs holding the valve element, dimensions which result in the spring constant of the spring elements being at least twice as large as the spring constant of the return springs being recommended.

It must also be pointed out that instead of a stamping process for the manufacture of one or more of the plates mentioned above, other cutting processes may also be used, for example, laser beam cutting or machining with a wire EDM machine (electrical discharge machining).

Several or all of the plates mentioned above can be simply and cost-effectively joined together by spot welding.

The check valve according to the invention can be integrated into a housing of flat construction, or also installed in the manner of a flat gasket between two pipe flanges of an exhaust gas return line.

In order that the check valve according to the invention will in the open state provide as large an opening cross section as possible and form as low a flow resistance as possible for the flow of exhaust gas, in preferred embodiments of the check valve according to the invention—seen in the direction of the valve axis—the spring elements and the return springs are of at least approximately identical design and are arranged at least approximately congruently over one another. However, such a design of the check valve has yet a further advantage: When the valve element moves into its open position and its stroke is delimited in this open position, the valve element and the stop element may (but do not necessarily have to) lie against each other. The stroke may, however, also be delimited by the return springs holding the valve element lying against the spring elements holding the stop element. In addition, the spring elements carrying the stop element then also limit the deflection of the return springs carrying the valve element, and, in this connection, it is to be noted that the spring elements carrying the stop element may have a considerably larger spring constant than the return springs carrying the valve element, namely, when the valve element, in the course of the opening of the check valve, can cover part of its stroke before the valve element touches the stop element and/or the return springs of the valve element touch the spring elements of the stop element—in preferred embodiments of the check valve according to the invention, the valve element only touches the stop element shortly before its open position, and the same applies accordingly to the return springs and the spring elements.

In this connection, for the sake of completeness, it is also pointed out that in embodiments of the check valve according to the invention which comprise a base plate forming the valve seat or another component which extends from the valve seat—with respect to the valve axis—in a radial direction outwards, the base plate or this component prevents an overshoot of the return springs holding the valve element when in the course of the closing of the check valve the valve element strikes the valve seat.

In embodiments of the check valve according to the invention with a gas space serving to damp the movement of the valve element, it may be advantageous, for a defined damping of the movement of the valve element into its open position defined by the stop element, to provide the stop element and/or the valve element with a small gas through-opening, by the size of which the damping effect can be predefined.

For check valves according to the invention which are provided with a gas space serving to damp the movement of the valve element it is also recommended that these be so designed that for formation of the gas space, the stop element and/or the valve element comprise at least one arch facing away from the respective other element, in order that the gas space is given a considerable volume, and the gas serving to damp the movement when the valve element approaches the stop element is first "caught" to a certain extent between the valve element and the stop element.

In an internal combustion reciprocating piston engine there are operating states for which it is expedient to completely prevent or at least strongly reduce the exhaust gas recirculation (for example, when the engine power is rapidly increased for the purpose of high acceleration of a vehicle), even if the gas pressure on the inflow side of the valve is greater than on its outflow side. For this case it is recommended that the check valve according to the invention be so constructed that in order to close the check valve, the stop element is made to approach the valve seat in the direction of the valve axis by an actuating element in such a way that the exhaust gas through-opening is closed in an at least approximately gas-tight manner by the valve element.

From the foregoing it will be apparent that with a check valve according to the invention, it is made possible by suitable design and arrangement of the return springs carrying the valve element that the check valve will not already open at a very low overpressure on its inflow side, however, the design and dimensioning of the return springs make it possible for its spring constant to be readily predefined in such a way that the check valve will open at a specified overpressure on its inflow side.

Finally, it is pointed out that in a check valve according to the invention with a resiliently held stop element, the exact open position of the valve element and, therefore, the exact size of the stroke of the valve element is dependent upon the spring constant of the spring elements holding the stop element and upon the pressure difference acting on the check valve or upon the flow velocity of the exhaust gas flowing against the check valve, but the fluctuation range of the valve element stroke is, in general, negligible.

Further features, advantages and details of the invention will be apparent from the following description and the appended drawings of two preferred embodiments of the check valve according to the invention.

DETAILED DESCRIPTION OF THE INVENTION

Figure 1:
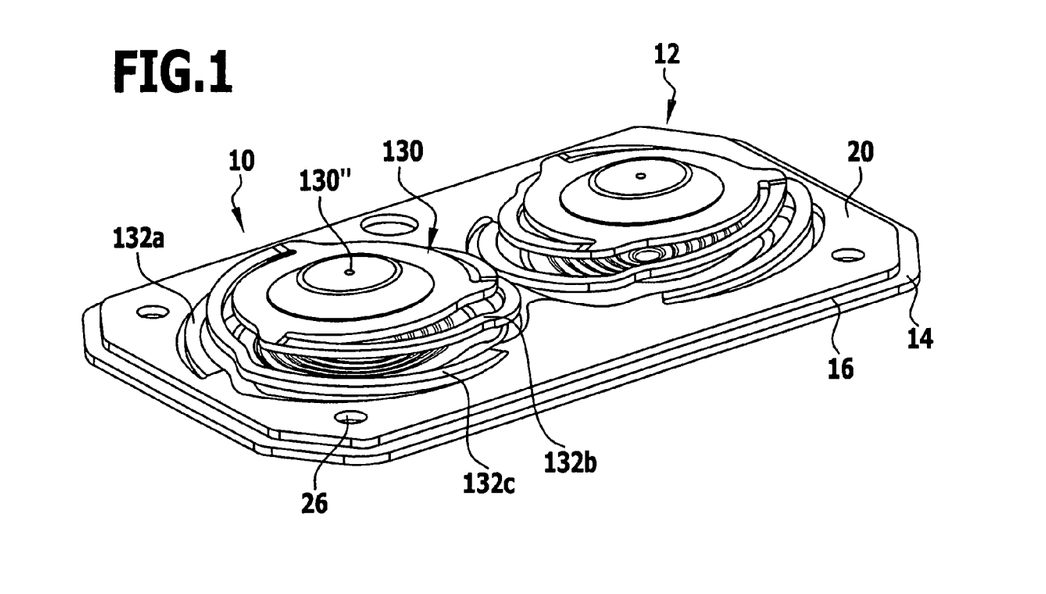
FIG. 1 shows an isometric view of the first embodiment of the check valve according to the invention.
Figure 3:
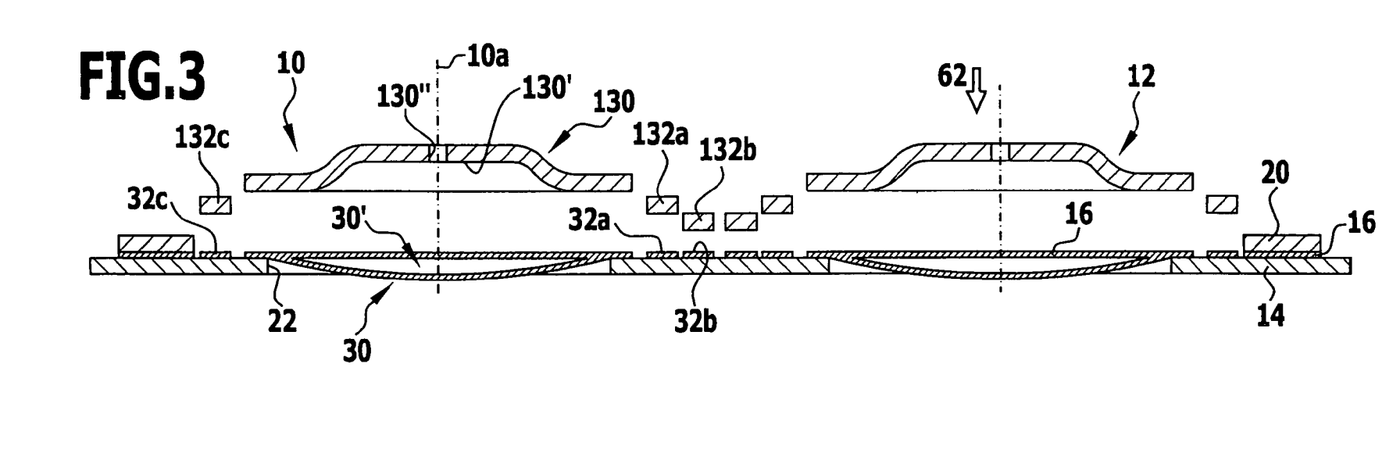
FIG. 3 shows a section taken along line 3-3 in FIG. 2, which shows the check valve in the closed state.

As will be apparent from FIGS. 1 and 3, this embodiment comprises two check valves 10 and 12 according to the invention, which are arranged next to each other. The check valves 10 and 12 are of identical design and are formed by three metallic plates, namely a base plate 14, a valve element plate 16 and a stop element plate 20, which are arranged on one another and are connected to one another. These three plates will first be described with reference to FIGS. 4A to 6B. For the sake of clarity, only those elements will be mentioned and explained which belong to one of the two check valves 10, 12 of identical design, namely to check valve 10.

Figure 4A:
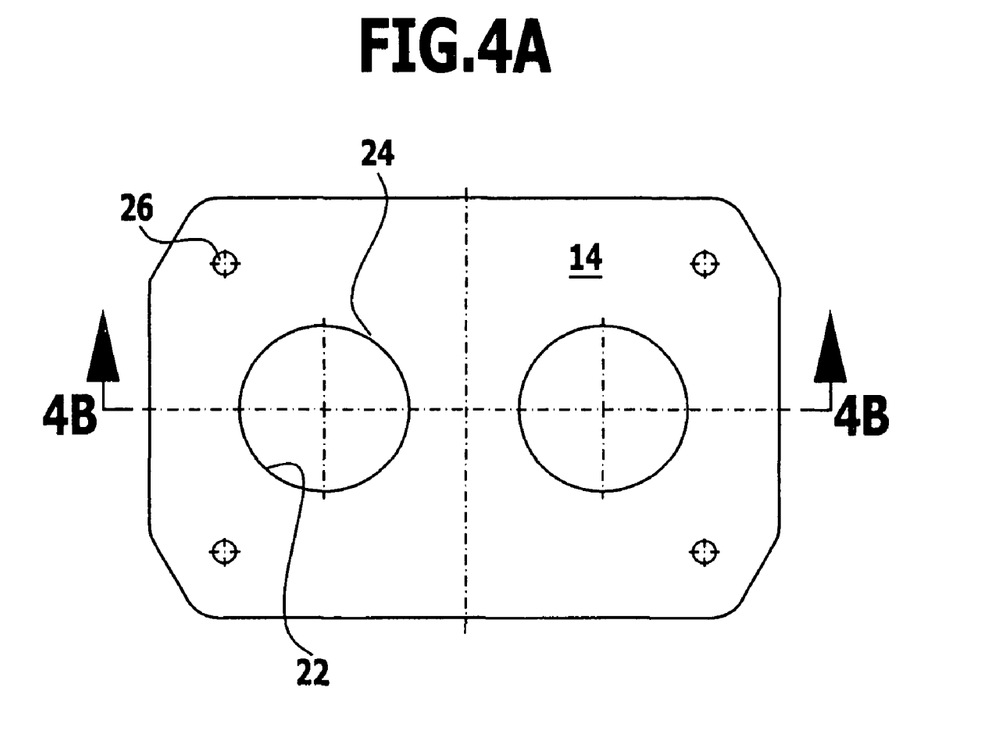
FIG. 4A shows a plan view of the base plate of the first embodiment of the check valve according to the invention, which is provided with the valve seat.
Figure 4B:
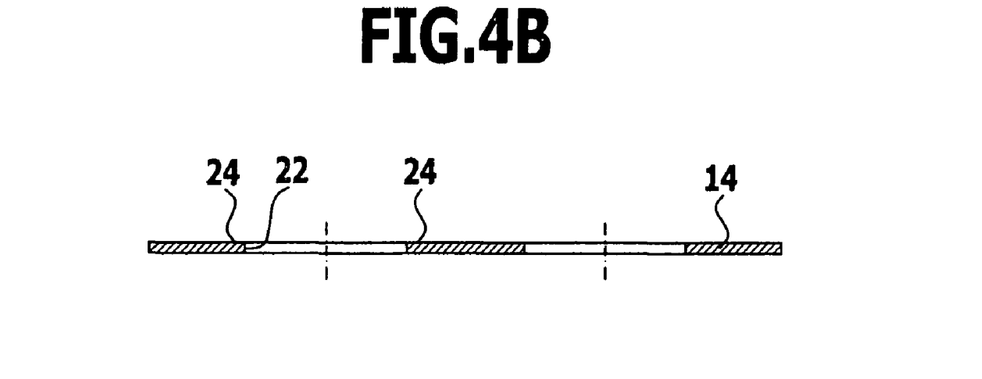
FIG. 4B shows a section taken along line 4B-4B in FIG. 4A.

The base plate 14 shown in FIGS. 4A and 4B has for the check valve 10 a circular exhaust gas through-opening 22, the circumferential rim area of which forms a valve seat 24. The base plate 14 also has (as do the two other plates to be explained hereinbelow) holes 26 for connecting the plates of the check valve to one another and/or for the passage of assembly bolts, with which the unit comprising the two check valves 10, 12 can be clamped between flanges, for example, of a valve housing or of exhaust gas pipeline sections.

Figure 5A:
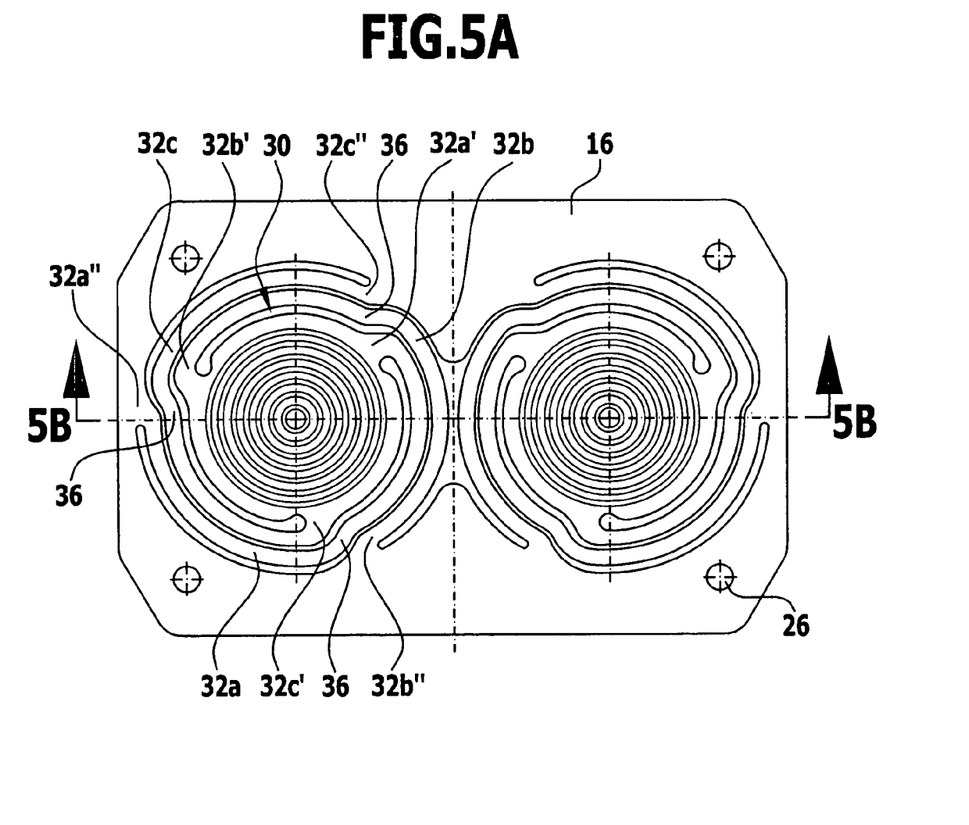
FIG. 5A shows a plan view of the valve element plate of the first embodiment, which is provided with the valve element.
Figure 5B:
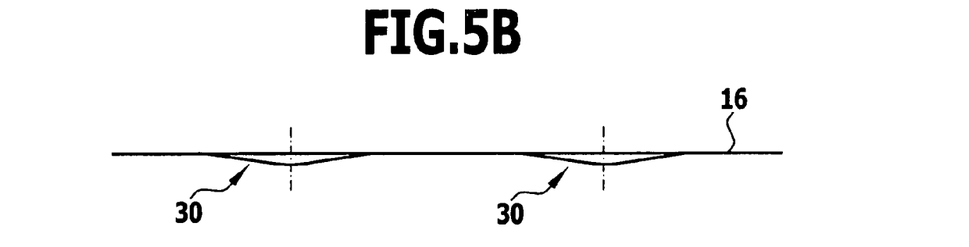
FIG. 5B shows a section taken along line 5B-5B in FIG. 5A.

As will be apparent from FIGS. 5A and 5B, the valve element plate 16 has for the check valve 10 an area which, in a plan view of the valve element plate 16, has the shape of a circular disc and forms a valve element 30. The center of the valve element 30 lies, as does the center of the exhaust gas through-opening 22, on a valve axis 10a (see FIG. 3) of the check valve 10, this valve axis extending perpendicularly to the plane defined, in particular, by the base plate 14. As will be most clearly apparent from FIG. 5A, three return springs 32a, 32b and 32c are integral components of the valve element plate 16 and continue with first ends 32a', 32b' and 32c' into the valve element 30 which is, therefore, also an integral component of the valve element plate 16.

The valve element 30 is pot-shaped, as shown particularly clearly in FIG. 3, more specifically, an arch 30' formed by the valve element 30 engages with its convex side, when the check valve is closed, in the exhaust gas through-opening 22, whereas the concave side of the arch 30' faces the stop element plate 20. Embodiments are preferred, in which the outer diameter of the arch 30' is, at most, identical in size to the diameter of the exhaust gas through-opening 22. In the embodiment shown, the arch 30' was formed by the metal sheet forming the valve element plate 16 being offset along circular rings apparent from FIG. 5A, so as to produce, in the plan view of the valve element 30, circular ring-shaped steps.

The first ends 32a', 32b' and 32c' of the return springs are arranged at the same circumference angle spacings from one another at the circumference of the valve element 30, and the second ends 32a", 32b" and 32c" of the return springs, at which these continue into the actual valve element plate 16, are also arranged at the same circumference angle spacings from one another. In accordance with the invention, all three return springs 32a, 32b and 32c are of identical design. Each return spring has approximately at the center of its length (measured in the circumferential direction of the valve element 30) an offset 36 (in a plan view of the valve element plate 16), at either side of which the respective return spring has the shape of a circular arc, each circular arc extending concentrically with the valve axis 10a. In each return spring 32a, 32b and 32c, the inner spring section lying between the offset 36 and the first end of the respective return spring, which inner spring section lies closer to the valve element 30 than the other outer spring section lying between the offset 36 and the second end 32a", 32b" and 32c" of the return spring, is overlapped by an outer spring section of one of the two other return springs, while the outer spring section of the return spring considered overlaps an inner spring section of a second one of the two other return springs. Furthermore, in accordance with the invention, the first ends 32a', 32b' and 32c' of the return springs are immediately adjacent to the offsets 36, as are the second ends 32a", 32b" and 32c". In this way, in particular, owing to the fact that, in accordance with the invention, the return springs are nested into one another, a particularly compact construction of the check valve according to the invention in a radial direction with respect to the valve axis 10a is obtained, and yet the length of the return springs is comparatively large.

As shown in FIG. 3, when the check valve is closed, all return springs 32a, 32b and 32c lie, in accordance with the invention, at least almost fully on the base plate 14, so that they cannot overshoot when the check valve is closed by the valve 30 in accordance with FIG. 3 being moved from above against the base plate 14 until a circumferential rim area of the valve element 30 rests in a sealing manner on the circular ring-shaped valve seat 24 of the base plate 14.

Figure 6A:
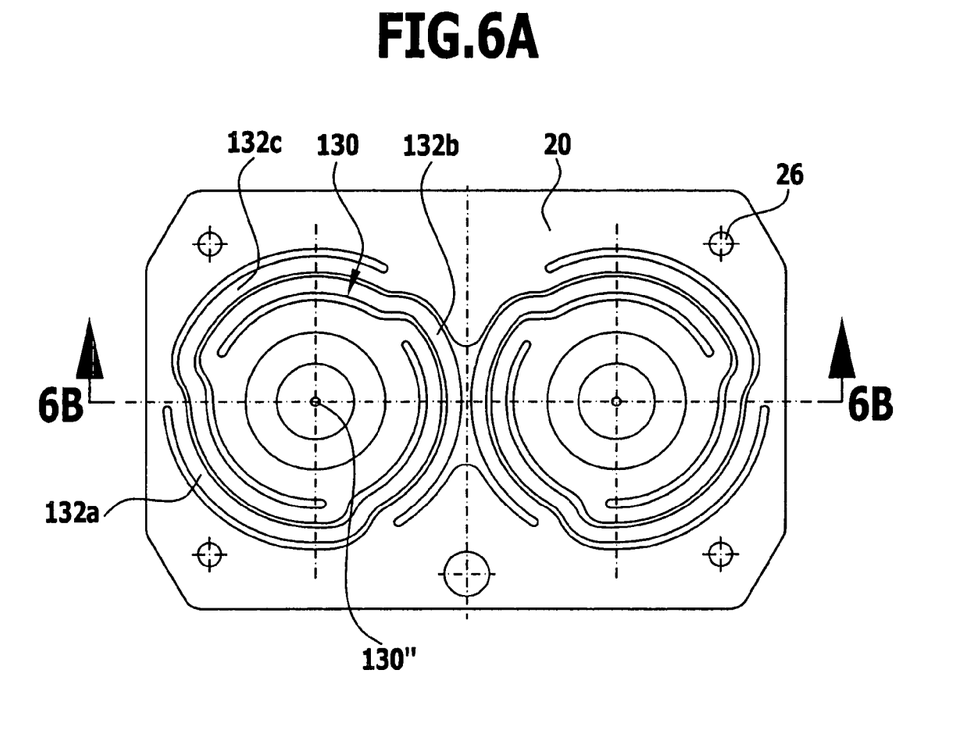
FIG. 6A shows a plan view of the stop element plate of the first embodiment, which is provided with the stop element.
Figure 6B:
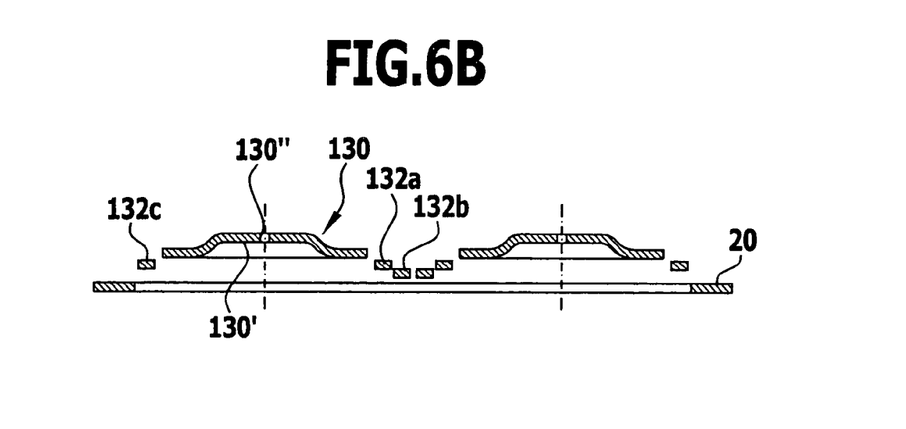
FIG. 6B shows a section taken along line 6B-6B in FIG. 6A.

As a comparison of FIGS. 5A and 6A and of FIGS. 3 and 6B show, except for the different thickness of the flat materials used for the two plates, the stop element plate 20, seen in a plan view in the direction of the valve axis 10a, is of exactly the same design as the valve element plate 16, at least in the area of its stop element and its spring elements holding the latter. Consequently, the description of the design of the stop element plate 20 can be kept relatively short, and in order to make the conformities clear, the same reference numerals were used for the elements of the stop element plate 20 as for the elements of the valve element plate 16, but increased by 100.

A stop element 130 which in a plan view of the stop element plate 20 has approximately the shape of a circular disc is held by three spring elements 132a, 132b and 132c, which, in the plan view of the stop element plate 20, are designed and arranged in exactly the same way as the return springs 32a, 32b and 32c of the valve element plate 16 in a plan view of the latter. However, in accordance with the invention, a spring steel sheet of larger thickness was used for the stop element plate 20 than for the valve element plate 16. Furthermore, in the embodiment according to the invention shown herein, the stop element 130, in a plan view of the stop element plate 20, is of exactly the same design as the valve element 30 in a plan view of the valve element plate 16.

Figure 2:
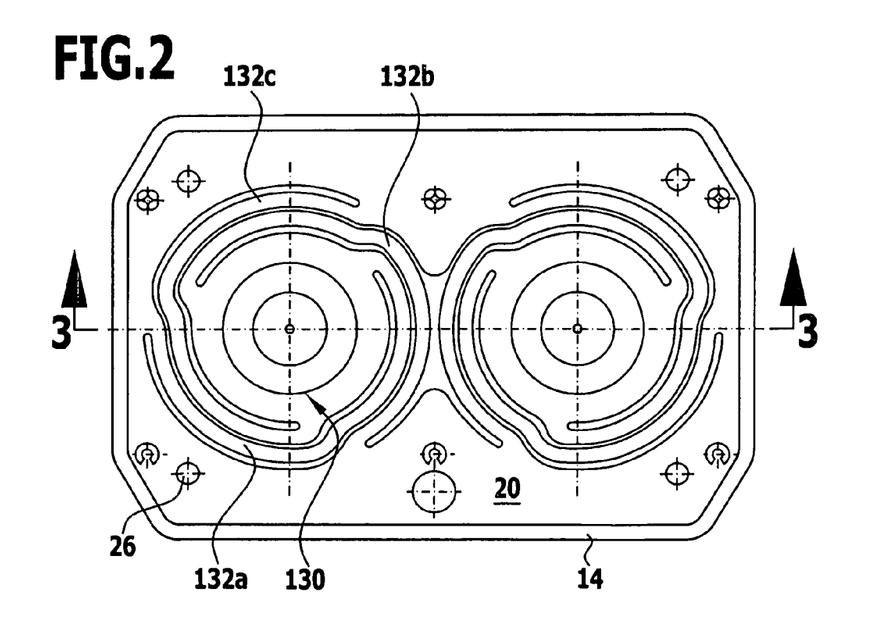
FIG. 2 shows a plan view of the first embodiment (seen from above in accordance with FIG. 1)

In accordance with the invention, in a plan view of the check valve 10, the return springs 32a, 32b and 32c and the spring elements 132a, 132b and 132c lie at least approximately congruently over one another, as do the stop element 130 and the valve element 30 (see, in particular, FIG. 2).

In accordance with the invention, the stop element 130 is also provided with an arch 130' which, however, differently from the arch 30' of the valve element 30, is upwardly and not downwardly arched. However, as will be apparent from FIG. 7, the diameter of the arch 130' is at least approximately as large as the diameter of the arch 30' of the valve element 30.

In accordance with the invention, however, when the check valve 10 is in the state in which no forces act thereon, the stop element 130 already lies above that plane which is defined by the stop plate 20 outside the spring elements 132a, 132b and 132c (see FIG. 3), and in the state in which no forces act on the check valve 10 the spring elements carrying the stop element 130 already extend upwards out of this plane like sections of a coil.

Figure 7:
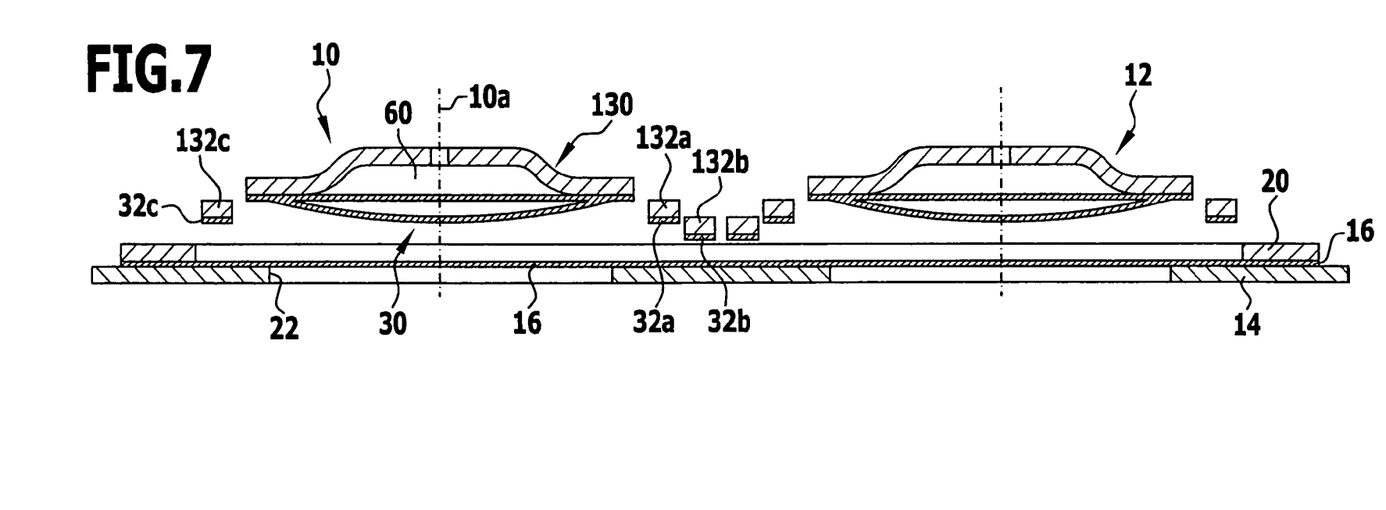
FIG. 7 again shows a section taken along line 3-3 in FIG. 2, but with the check valve fully open.

In the fully open state of the check valve 10 shown in FIG. 7, in which the valve element 30 lies with a circumferential rim area against a circumferential rim area of the stop element 130, the valve element 30 and the stop element 130 form on account of their arches 30' and 130', respectively, between them a gas space 60, the gas content of which acts as "shock absorber" when the valve element 30 strikes the stop element 130, and the gas volume present between the two elements immediately before the striking must be partially displaced radially outwardly, and the circumferential rim areas of the valve element 30 and the stop element 130 lying against one another finally close off the gas space 60 in an at least almost gas-tight manner.

In accordance with the invention, the degree of the damping can be predetermined by the stop element 130 (and/or the valve element 30) being provided radially within its circumferential rim area with a small gas through-opening 130", the opening cross section of which can be preselected—a maximum damping is, of course, obtained without a gas through-opening 130".

As will be apparent from FIG. 7, when the check valve is fully open, not only the circumferential rim areas of the valve element 30 and the stop element 130 lie against one another, but also the return springs holding the valve element 30 lie against the spring elements holding the stop element 130, and since the spring constant of these spring elements is greater than the spring constant of the return springs, the latter are unable to overshoot and thereby become overstrained upon opening of the check valve.

An actuating element 62 represented by an arrow and shown in FIG. 3 is designed, for example, as an eccentric which is rotatable in a controlled manner and can be pressed with such a downwardly directed force onto the stop element 130 that the valve element 30 can also be pressed downwards against the valve seat 24 by the circumferential rim area of the stop element 130 when on the lower side—in accordance with drawings—of the valve element 30 a higher gas pressure prevails than on its upper side. Therefore, a check valve according to the invention can be completely or partially closed without any difficulty by means of such an actuating element 62, more particularly, independently of the pressure difference prevailing at the valve element 30.

Figure 8:
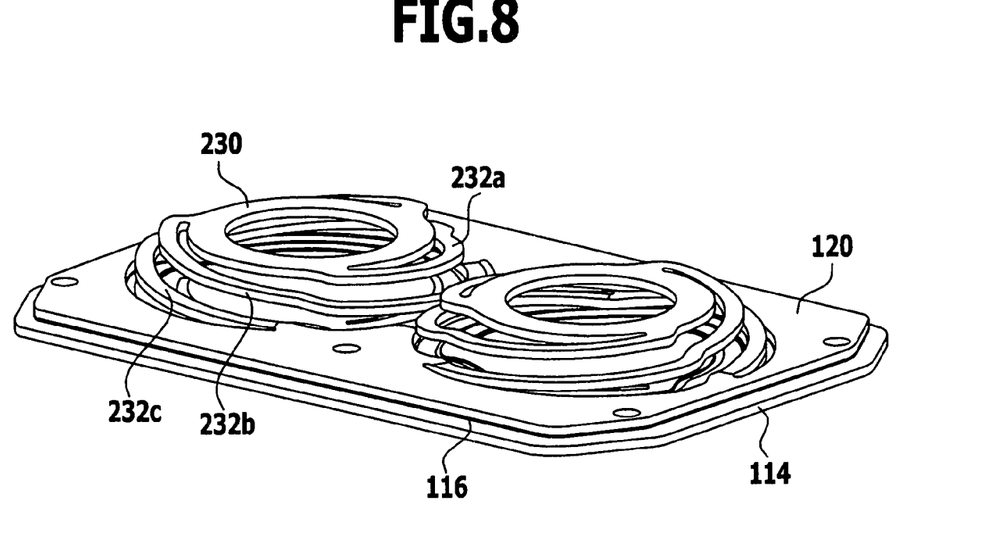
FIG. 8 shows an isometric view of the second embodiment of the check valve according to the invention.

Finally, FIG. 8 shows a second embodiment of the check valve according to the invention, which differs from the first embodiment only with respect to the design of the stop element and, therefore, the same reference numerals were used in FIG. 8 as in FIGS. 1 to 7, but increased by 100.

As is clearly shown in FIG. 8, the stop element 230 in this second embodiment does not have the shape of a small, in particular, circular plate, i.e., the stop element 230 does not form a closed "cover" over the valve element 30. Rather, in this second embodiment, the stop element 130 has the shape of a circular ring for the purpose of supporting the circumferential rim area of the valve element 30 when the latter is in its upper end position. With regard to the design of the stop element 230, it should, however, be noted that it is merely a question of the circumferential rim area of the valve element 30 being adequately supported all around.

As FIG. 3 shows, in preferred embodiments of the check valve according to the invention, the spring elements holding the stop element already rise above the stop element plate when the check valve is closed, i.e., these spring. elements are preformed so as to create a spacing between the stop element and the valve element.

The invention claimed is:

1. Exhaust gas check valve for an exhaust gas return line leading from an exhaust gas side to a fresh air side of an internal combustion reciprocating piston engine, said exhaust gas check valve comprising a movable valve element made of flat material, which is held by a plurality of return springs, and a valve seat with an exhaust gas through-opening which defines a valve axis of the check valve and is at least almost closable by the valve element in a closed position of the valve element, said valve element being movable in the direction of the valve axis away from the valve seat against the action of the return springs by a flow of exhaust gas flowing against the exhaust gas through-opening in the direction towards the valve element, and said return springs being arranged in spaced relation to one another at the circumference of the valve element, said check valve comprising on the side of the valve element that faces away from the valve seat at least one stop element which delimits the stroke of the valve element up to an open position of the valve element and is held by at least one spring element for movement in the direction of the valve axis.

2. Check valve in accordance with claim 1, wherein both the valve element and the stop element, seen in the direction of the valve axis, are of plate-shaped design, and the valve element and the stop element are of such shape that in its open position the valve element defines together with the stop element a gas space which is at least almost closed by the valve element in its open position and the stop element.

3. Check valve in accordance with claim 1, wherein the stop element is held by a plurality of spring elements which are arranged in spaced relation to one another at the circumference of the stop element.

4. Check valve in accordance with claim 1, wherein the spring element is a strip-like spring made of flat material.

5. Check valve in accordance with claim 1, wherein each of the return springs is a strip-like spring made of flat material.

6. Check valve in accordance with claim 1, wherein each of the return springs, seen in the direction of the valve axis, forms an arcuate strip, one, first end of which carries the valve element.

7. Check valve in accordance with claim 3, wherein each of the spring elements, seen in the direction of the valve axis, forms an arcuate strip, one, first end of which carries the stop element.

8. Check valve in accordance with claim 6, wherein the arcuate strip, seen in the direction of the valve axis, has a shape corresponding approximately to a section of a spiral, and along the strip in the direction towards the first strip end the arcuate strip approaches the valve axis.

9. Check valve in accordance with claim 6, wherein, in each case, at least those two arcuate strips, seen in the direction of the valve axis, whose first ends are arranged in proximity to each other, overlap each other over a portion of their length.

10. Check valve in accordance with claim 9, wherein each arcuate strip is overlapped over a first portion of its length by a—seen from the valve axis—radially further outwardly lying arcuate strip and overlaps over another portion of its length a further inwardly lying arcuate strip.

11. Check valve in accordance with claim 9, wherein each return spring, seen in the direction of the valve axis, is offset between its ends in the direction towards the valve axis at a point in the proximity of the second end of the further outwardly lying return spring.

12. Check valve in accordance with claim 1, wherein the spring constant of the spring elements holding the stop element is considerably larger than the spring constant of the return springs holding the valve element.

13. Check valve in accordance with claim 7, wherein the arcuate strip, seen in the direction of the valve axis, has a shape corresponding approximately to a section of a spiral, and along the strip in the direction towards the first strip end the arcuate strip approaches the valve axis.

14. Check valve in accordance with claim 7, wherein, in each case, at least those two arcuate strips, seen in the direction of the valve axis, whose first ends are arranged in proximity to each other, overlap each other over a portion of their length.

15. Check valve in accordance with claim 14, wherein each arcuate strip is overlapped over a first portion of its length by a —seen from the valve axis —radially further outwardly lying arcuate strip and overlaps over another portion of its length a further inwardly lying arcuate strip.

16. Check valve in accordance with claim 14, wherein each spring element, seen in the direction of the valve axis, is offset between its ends in the direction towards the valve axis at a point in the proximity of the second end of the further outwardly lying spring element.

17. Check valve in accordance with claim 1, wherein the valve element, seen in the direction of the valve axis, has approximately the shape of a circular disc.

18. Check valve in accordance with claim 1, wherein the stop element, seen in the direction of the valve axis, has approximately the shape of a circular disc.

19. Check valve in accordance with claim 1, comprising a base plate provided with the exhaust gas through-opening and the valve seat, a valve element plate provided with the valve element and the return springs, and a stop element plate provided with the stop element and the spring elements.

20. Check valve in accordance with claim 19, wherein the material thickness of the valve element plate is considerably less than the material thickness of the base plate.

21. Check valve in accordance with claim 19, wherein at least one of the plates is a stamped part.

22. Check valve in accordance with claim 19, wherein at least one of the valve element plate and the stop element plate consists of sheet spring steel.

23. Check valve in accordance with claim 19, wherein the plates consist of stainless steel.

24. Check valve in accordance with claim 3, wherein the spring elements and the return springs, seen in the direction of the valve axis, are of at least approximately identical design and are arranged at least approximately congruently over one another.

25. Check valve in accordance with claim 2, wherein at least one of the stop element and the valve element has a small gas through-opening for a defined damping of the movement of the valve element into its open position defined by the stop element.

26. Check valve in accordance with claim 2, wherein at least one of the stop element and the valve element has at least one arch facing away from the respective other element for formation of the gas space.

27. Exhaust gas check valve for an exhaust gas return line leading from an exhaust gas side to a fresh air side of an internal combustion reciprocating piston engine, said exhaust gas check valve comprising a movable valve element made of flat material, which is held by a plurality of return springs, and a valve seat with an exhaust gas through-opening which defines a valve axis of the check valve and is at least almost closable by the valve element in a closed position of the valve element, said valve element being movable in the direction of the valve axis away from the valve seat against the action of the return springs by a flow of exhaust gas flowing against the exhaust gas through-opening in the direction towards the valve element, and said return springs being arranged in spaced relation to one another at the circumference of the valve element, said check valve comprising on the side of the valve element that faces away from the valve seat at least one stop element which delimits the stroke of the valve element up to an open position of the valve element, and both the valve element and the stop element, seen in the direction of the valve axis, being of plate-shaped design, and the valve element and the stop element being of such shape that in its open position the valve element defines together with the stop element a gas space which is at least almost closed by the valve element in its open position and the stop element.

28. Check valve in accordance with claim 27, wherein the stop element is held for movement in the direction of the valve axis by at least one spring element.

29. Check valve in accordance with claim 28, wherein the stop element is held by a plurality of spring elements which are arranged in spaced relation to one another at the circumference of the stop element.

30. Check valve in accordance with claim 28, wherein the spring element is a strip-like spring made of flat material.

31. Check valve in accordance with claim 27, wherein each of the return springs is a strip-like spring made of flat material.

32. Check valve in accordance with claim 27, wherein each of the return springs, seen in the direction of the valve axis, forms an arcuate strip, one, first end of which carries the valve element.

33. Check valve in accordance with claim 29, wherein each of the spring elements, seen in the direction of the valve axis, forms an arcuate strip, one, first end of which carries the stop element.

34. Check valve in accordance with claim 32, wherein the arcuate strip, seen in the direction of the valve axis, has a shape corresponding approximately to a section of a spiral, and along the strip in the direction towards the first strip end the arcuate strip approaches the valve axis.

35. Check valve in accordance with claim 33, wherein the arcuate strip, seen in the direction of the valve axis, has a shape corresponding approximately to a section of a spiral, and along the strip in the direction towards the first strip end the arcuate strip approaches the valve axis.

36. Check valve in accordance with claim 32, wherein, in each case, at least those two arcuate strips, seen in the direction of the valve axis, whose first ends are arranged in proximity to each other, overlap each other over a portion of their length.

37. Check valve in accordance with claim 33, wherein, in each case, at least those two arcuate strips, seen in the direction of the valve axis, whose first ends are arranged in proximity to each other, overlap each other over a portion of their length.

38. Check valve in accordance with claim 36, wherein each arcuate strip is overlapped over a first portion of its length by a —seen from the valve axis —radially further outwardly lying arcuate strip and overlaps over another portion of its length a further inwardly lying arcuate strip.

39. Check valve in accordance with claim 37, wherein each arcuate strip is overlapped over a first portion of its length by a —seen from the valve axis —radially further outwardly lying arcuate strip and overlaps over another portion of its length a further inwardly lying arcuate strip.

40. Check valve in accordance with claim 36, wherein each return spring, seen in the direction of the valve axis, is offset between its ends in the direction towards the valve axis at a point in the proximity of the second end of the further outwardly lying return spring.

41. Check valve in accordance with claim 37, wherein each spring element, seen in the direction of the valve axis, is offset between its ends in the direction towards the valve axis at a point in the proximity of the second end of the further outwardly lying spring element.

42. Check valve in accordance with claim 27, wherein the valve element, seen in the direction of the valve axis, has approximately the shape of a circular disc.

43. Check valve in accordance with claim 27, wherein the stop element, seen in the direction of the valve axis, has approximately the shape of a circular disc.

44. Check valve in accordance with claim 27, comprising a base plate provided with the exhaust gas through-opening and the valve seat, a valve element plate provided with the valve element and the return springs, and a stop element plate provided with the stop element and the spring elements.

45. Check valve in accordance with claim 44, wherein the material thickness of the valve element plate is considerably less than the material thickness of the base plate.

46. Check valve in accordance with claim 44, wherein at least one of the plates is a stamped part.

47. Check valve in accordance with claim 44, wherein at least one of the valve element plate and the stop element plate consists of sheet spring steel.

48. Check valve in accordance with claim 44, wherein the plates consist of stainless steel.

49. Check valve in accordance with claim 29, wherein the spring elements and the return springs, seen in the direction of the valve axis, are of at least approximately identical design and are arranged at least approximately congruently over one another.

50. Check valve in accordance with claim 27, wherein at least one of the stop element and the valve element has a small gas through-opening for a defined damping of the movement of the valve element into its open position defined by the stop element.

51. Check valve in accordance with claim 27, wherein at least one of the stop element and the valve element has at least one arch facing away from the respective other element for formation of the gas space.

52. Check valve in accordance with claim 27, wherein the spring constant of the spring elements holding the stop element is considerably larger than the spring constant of the return springs holding the valve element.

* * * * *